United States Patent Office.

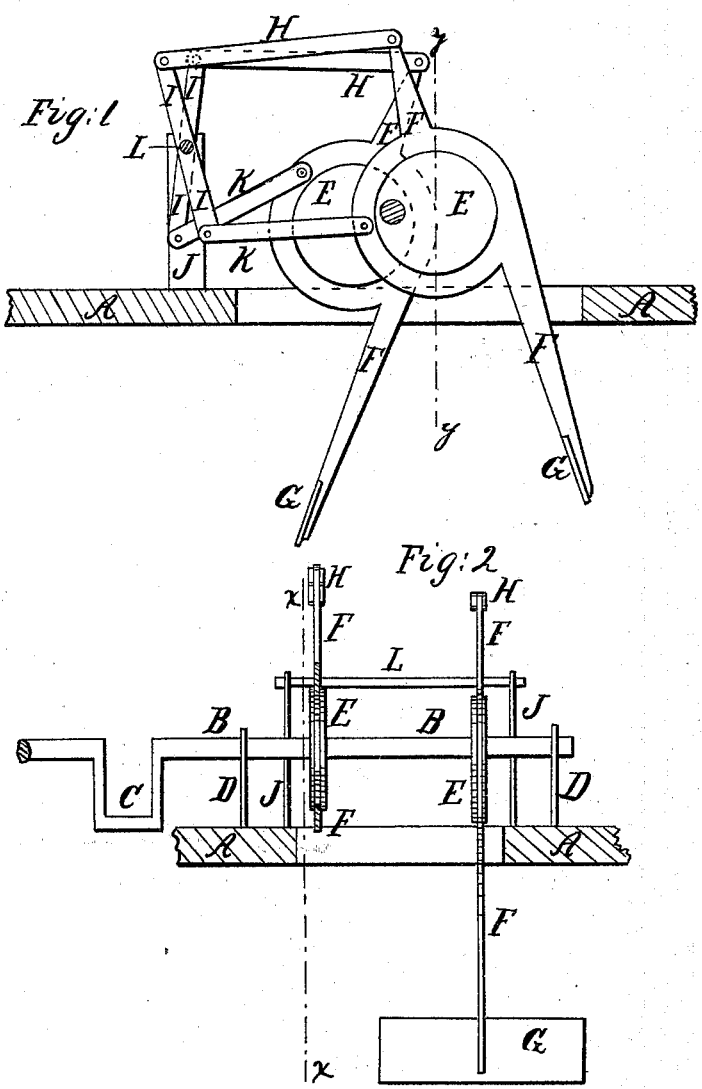

JORDAN H. PHILLIPS, OF ST. LOUIS, MISSOURI.

Letters Patent No. 61,861, dated February 5, 1867; antedated January 30, 1867.

IMPROVED PROPELLER.

The Schedule referred to in these Letters Patent and making part of the same.

TO ALL WHOM IT MAY CONCERN:

Be it known that I, JORDAN H. PHILLIPS, of the city and county of St. Louis, and State of Missouri, have invented a new and useful improvement in Paddle Propeller; and I do hereby declare that the following is a full, clear, and exact description thereof, which will enable others skilled in the art to make and use the same, reference being had to the accompanying drawing, forming part of this specification, in which—

Figure 1 is a vertical section of my improved paddle propeller taken through the line $xx$, fig. 2.

Figure 2 is a vertical section of the same taken through the line $yy$, fig. 1.

Similar letters of reference indicate like parts.

My invention has for its object to furnish an improved apparatus for propelling vessels, so constructed and arranged that the paddles shall enter the water without any jar and leave it without lifting any water, the whole power being expended in propelling the vessel; and it consists in the combination and arrangement of the paddles, levers, rods, and eccentrics with each other and with the driving-shaft, as hereinafter more fully described.

A is the framework that supports the apparatus; B is the main or driving-shaft; and C is the crank to which the power is applied. The shaft B revolves in bearings in the supports D. To the shaft B are attached the eccentrics E, as shown in fig. 1, the circumferences of which are perfect circles. F are the long levers, to the lower ends of which are attached the paddles G. The central parts of the levers F are made broad, and are formed into collars or sleeves, which fit into grooves formed around the circumferences of the eccentrics E, as shown in fig. 2. To the upper ends of the levers F are pivoted the ends of the connecting-bars or rods H, the other ends of which are pivoted to the upper ends of the upright equal-armed levers I, as shown in fig. 1. The levers I are pivoted at their middle points to a shaft, L, passing through the supports J, and to their lower ends are pivoted the ends of the connecting-bars or rods K. The other ends of the rod K are pivoted to the broad part or collar of the levers F. By this arrangement the paddles G are made to move through the water about three times as far as the simple throw of the eccentrics would cause them to move. It also brings the paddles into such positions that they enter the water without any jar and leave it without lifting any water, so that the whole power is expended in propelling the vessel. Only two sets of levers, eccentrics, rods, and paddles, are represented as being attached to the shaft B; but any desired number may be attached that the circumstances of the case may require, and they may be so arranged that any desired number may always be in the water at the same time. The levers I may, if desired, be extended downwards and the bars H removed and pivoted to the lower end of said extended levers and to the lower part of the levers F, below the bars K, as represented in the drawing. This construction will contract the propeller into smaller space, and the paddles G will still rise vertically from the water, but the stroke will be shorter and consequently less effective. But I prefer the construction first described.

I claim as new, and desire to secure by Letters Patent—

The combination and arrangement of the paddles G, levers F, eccentrics E, rods or bars H, levers I, and rods K, with each other and with the driving-shaft B, substantially as described and for the purpose set forth.

JORDAN H. PHILLIPS.

Witnesses:
THOMAS BRIODY,
L. SCHOEN.